(12) United States Patent
Wong et al.

(10) Patent No.: US 11,078,729 B2
(45) Date of Patent: Aug. 3, 2021

(54) SYSTEM AND METHOD FOR MANUFACTURING DOWNHOLE TOOL COMPONENTS

(71) Applicant: HALLIBURTON ENERGY SERVICES, INC., Houston, TX (US)

(72) Inventors: Alston Jun Ngai Wong, Singapore (SG); Jia Ming Kew, Singapore (SG); Doren Hui Ping Ho, Singapore (SG); Guan Yee Chan, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 279 days.

(21) Appl. No.: 16/198,065

(22) Filed: Nov. 21, 2018

(65) Prior Publication Data
US 2019/0093432 A1 Mar. 28, 2019

Related U.S. Application Data

(63) Continuation of application No. 15/520,775, filed as application No. PCT/US2014/067142 on Nov. 24, 2014, now Pat. No. 10,145,183.

(51) Int. Cl.
*E21B 17/00* (2006.01)
*B22F 3/105* (2006.01)
(Continued)

(52) U.S. Cl.
CPC ............. *E21B 17/00* (2013.01); *B22F 3/105* (2013.01); *B22F 5/00* (2013.01); *B22F 7/062* (2013.01);
(Continued)

(58) Field of Classification Search
CPC ...................................................... E21B 17/00
See application file for complete search history.

(56) References Cited

U.S. PATENT DOCUMENTS

| 4,577,702 A | 3/1986 | Faulkner |
| 5,544,550 A | 8/1996 | Smith |
| (Continued) | | |

FOREIGN PATENT DOCUMENTS

| CN | 1543531 A | 11/2004 |
| CN | 101896684 A | 11/2010 |
| (Continued) | | |

OTHER PUBLICATIONS

K.S. Woon, A.Chaudhari, M. Rahman, S. Wan, A. Senthil Kumar; The effects of tool edge radius on drill deflection and hole misalignment in deep hole dundrilling of Inconel-718; CIRP Annals—Manufacturing Technology 63 (2014); pp. 125-128.
(Continued)

*Primary Examiner* — Daniel H Lee
(74) *Attorney, Agent, or Firm* — Polsinelli PC

(57) ABSTRACT

A method is provided for manufacturing a segment of a drill string, such as a tubular tool, from a plurality of layers. The method includes arranging a plurality of layers based on a selected length of the segment. Each of the plurality of layers includes an aperture that is received over an alignment feature that restricts movement of the plurality of layers to two or fewer degrees of freedom. A joining process is performed to join the plurality of layers, which may include at least one replacement layer.

8 Claims, 7 Drawing Sheets

(51) Int. Cl.
*B22F 5/00* (2006.01)
*B22F 7/06* (2006.01)
*B23K 15/00* (2006.01)

(52) U.S. Cl.
CPC ...... *B23K 15/0006* (2013.01); *B23K 15/0053* (2013.01); *B22F 2005/001* (2013.01)

(56) References Cited

U.S. PATENT DOCUMENTS

| | | | |
|---|---|---|---|
| 5,555,946 | A | 9/1996 | Klatt |
| 5,714,205 | A | 2/1998 | Marantz et al. |
| 6,454,030 | B1 | 9/2002 | Findley et al. |
| 6,543,132 | B1 | 4/2003 | Krueger et al. |
| 2005/0052024 | A1 | 3/2005 | Herrington |
| 2005/0173128 | A1 | 8/2005 | Hall et al. |
| 2008/0075618 | A1* | 3/2008 | Martin .................. B22F 3/1055 419/6 |
| 2009/0011247 | A1 | 1/2009 | Barlow et al. |

FOREIGN PATENT DOCUMENTS

| | | |
|---|---|---|
| CN | 201731181 U | 2/2011 |
| GB | 2365040 A | 2/2002 |
| JP | 2003176816 A | 6/2003 |
| JP | 2011500993 A | 1/2011 |

OTHER PUBLICATIONS

Kamesh Tata, Georges Fadel, Amit Bagchi, Nadim Aziz; Efficient slicing for layered manufacturing; Rapid Protyping Journal vol. 4 (1998) pp. 151-167.

G. Madhusudan Reddy, K. Srinivasa Rao; Microstructure and mechanical properties of similar and dissimilar stainless steel electron beam and friction welds; Published online: Mar. 24, 2009 Springer-Verlag London Limited 2009 Int J Adv Manuf Technol (2009) 45:875-888.

Xiaping Qian, Debasish Dutta; Feature Based Fabrication in Layered Manufacturing; Journal of Mechanical Design Sep. 2001, vol. 123 pp. 337-345.

Guodong Zhang, Xinqi Yang, Xinlong He, Jinwei Li, Haichao Hu; Enhancement of mechanical properties and failure mechanism beam welded 300M ultrahigh strength steel joints; Materials and Design 45 (2013) pp. 56-66.

Corus Engineering Steels; BS SI55 (300M) High Silicon NiCrMov Steel Vaccum Arc Remelted (VAR); Corus Engineering Steel PO Box 50 Aldwarke Lane Rotherham S 60 1 DW UK; pp. 1-2.

PTR Precision Technologies; Electron Beam and Laser Welders; PTR-Precision Technologies, Inc. 120 Post Road Enfield, CT 06082; pp. 1-2.

Air Liquide Welding; Electron Beam welding process; www.airliguidewelding.com; pp. 1-8.

C.T. Chi, C.G. Chao, C.A. Huang, C.H. Lee; Investigation of Electron Beam WElding on AZ91D-F Extrusive Plates; Material Science Forum vols. 505-507 (2006) pp. 193-198.

International Search Report and Written Opinion; PCT Application No. PCT/US2014/067142; dated Jul. 29, 2015.

English abstract of CN201731181; retreived from www.espacenet.com on Apr. 19, 2017.

English abstract of JP2003176816; retreived from www.espacenet.com on Apr. 19, 2017.

International Preliminary Report on Patentability; PCT Application No. PCT/US2014/067142; dated Jun. 8, 2017.

Japanese Office Action; Japanese Application No. 2017-522333; dated Apr. 9, 2018.

English Abstract of JP2011500993; retreived from www.espacenet.com on May 30, 2018.

Chinese Office Action; Chinese Application No. 201480082906.0; dated Jun. 21, 2018.

English Abstract of CN1543531; retreived from www.espacenet.com on Sep. 20, 2018.

English Abstract of CN101896684; retreived from www.espacenet.com on Sep. 20, 2018.

* cited by examiner

SYSTEM AND METHOD FOR MANUFACTURING DOWNHOLE TOOL COMPONENTS

This application is a continuation of U.S. application Ser. No. 15/520,775, filed Apr. 20, 2017, which is the national stage entry of PCT/US2014/067142 filed Nov. 24, 2014, each of the aforementioned applications are expressly incorporated herein in its entirety.

FIELD

The present disclosure relates generally to drilling systems and particularly to drilling systems used for oil and gas exploration and production operations. More specifically, the present disclosure describes techniques for manufacturing downhole tool components using incremental construction techniques and subtractive manufacturing techniques.

BACKGROUND

A drill string is used in oil and gas exploration and production to reach subterranean destinations or formations. A drill string is assembled during drilling operations by joining tubular sections that include drill pipe, transition pipe, and a bottom hole assembly ("BHA"). An individual section of drill pipe may be referred to in the art as a joint. A pre-assembled group of two or more joints may be referred to in the art as a stand. As the well is drilled, joints or stands are added to the drill string from the surface until the desired depth is reached. The BHA typically includes a drill bit, drill collars, and drilling stabilizers. The drill collars may include downhole tools. The drill pipe and drill collars may be joined together using threaded connections. Subs may be used to connect sections with dissimilar threads.

The drill collars may be approximately 6-10 feet (1.8 m-3 m) in length and may include tools such as a downhole motor, a rotary steerable or directional drilling system, measurement while drilling ("MWD") equipment, logging while drilling ("LWD") equipment, and telemetry systems. A joint is typically on the order of 30 feet (9.1 m) long and has a small diameter and a relatively long length such as a depth to bore diameter ratio greater than 10:1. For example, each joint may include a diameter ranging from 1.5 to 5 inches and a length of 30 feet.

The components or modules within a drill string may include complex internal bore features that form conduits for routing wires or directing fluids through the drill string. The bore features may be formed parallel to, at an angle to, and/or perpendicular to a center line passing axially through the drill string.

Existing manufacturing techniques employ sophisticated equipment such as "gun drilling" to bore long and narrow passages axially through the sections. Existing manufacturing techniques must meet particular angle tolerances, profile tolerances, or positional tolerances to precisely form conduits or passages through the sections. As a result, partially completed portions of sections may need to be discarded and re-manufactured due to design tolerance faults.

BRIEF DESCRIPTION OF THE DRAWINGS

Implementations of the present technology will now be described, by way of example only, with reference to the attached figures, wherein.

DETAILED DESCRIPTION

Figure 1A:
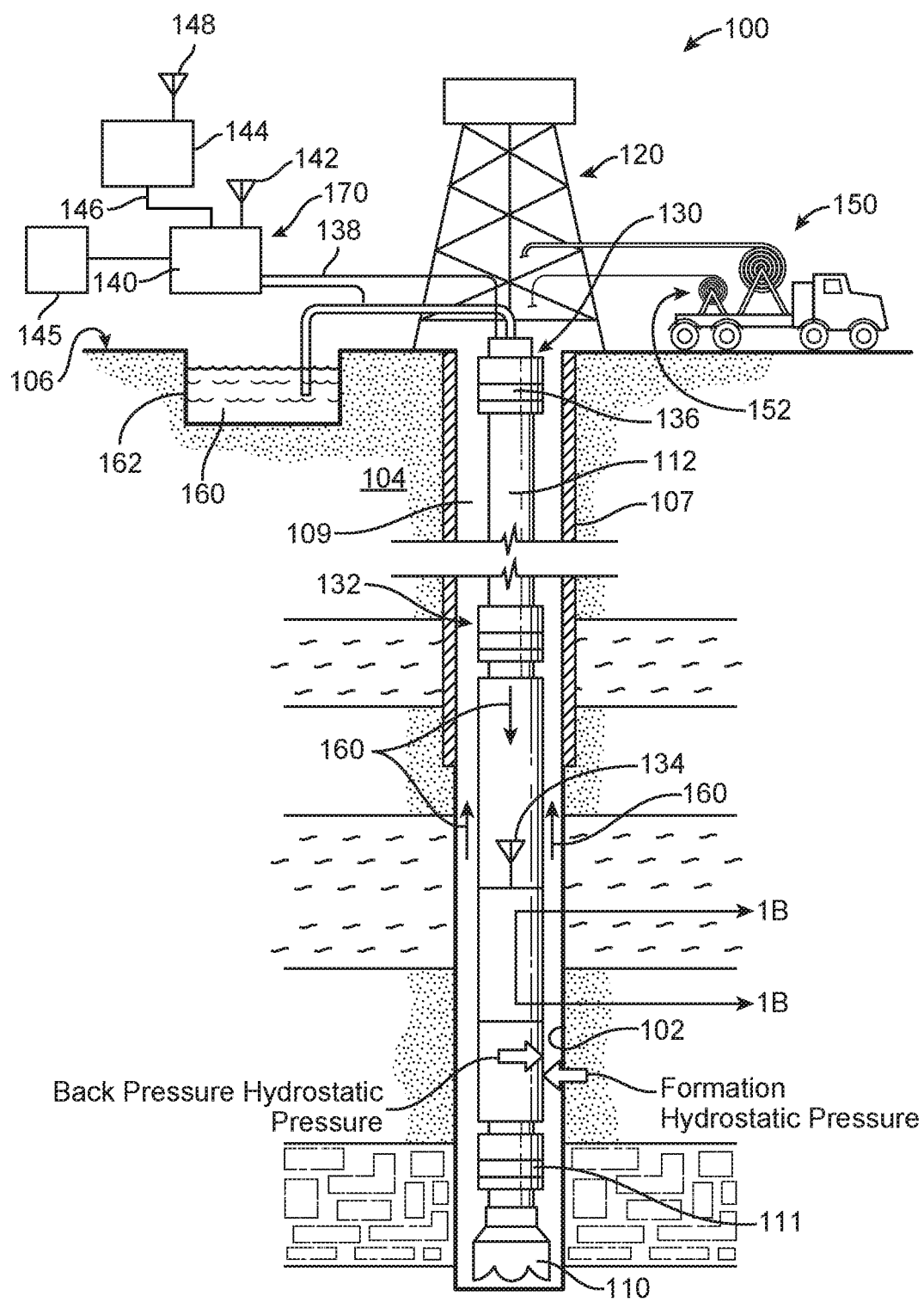
FIG. 1A is a partial cross-sectional view illustrating an embodiment of a drilling rig for drilling a wellbore with the drilling system configured in accordance with the principles of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, and the like orientations shall mean positions relative to the orientation of the wellbore or tool. Additionally, the illustrated embodiments are depicted so that the orientation is such that the right-hand side is downhole compared to the left-hand side.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "communicatively coupled" is defined as connected, either directly or indirectly through intervening components, and the connections are not necessarily limited to physical connections, but are connections that accommodate the transfer of data, fluids, or other matter between the so-described components. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other thing that "substantially" modifies, such that the component need not be exact. For example, substantially cylindrical means that the object resembles a cylinder, but can have one or more deviations from a true cylinder. The terms "comprising," "including" and "having" are used interchangeably in this disclosure. The terms "comprising," "including" and "having" mean to include, but not necessarily be limited to the things so described.

The term "radial" and/or "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

The drill string described in any of the various embodiments may comprise various equipment defining a fluid conduit, that extends downhole to support drilling operations. The drill string may include, for example, drill pipe, transition pipe, and a BHA having a drill bit, drill collars, and drilling stabilizers. The drill string may include drill pipe formed from individual joints, continuous coil tubing, or any other conduit that extends downhole to support drilling or workover operations. Each drill string used on a particular job or site is generally unique since its tools are selected based on factors particular to the well or the site, such as geology (e.g. composition of the formation including rock type, density, abrasiveness, etc.), budgetary and other considerations limiting which equipment is appropriate, and other factors with which one of ordinary skill in the art is familiar. An individual section of drill pipe may be referred to in the art as a joint.

"Processor" as used herein is an electronic circuit that can make determinations based upon inputs and is interchangeable with the term "controller." A processor can include a microprocessor, a microcontroller, and a central processing unit, among others. While a single processor can be used, the present disclosure can be implemented over a plurality of processors, including local controllers provided in a tool or sensors provided along the drill pipe.

According to one example, open-hole operations are employed during well construction. The open-hole operations typically include forming casing strings, such as a surface casing and intermediate casing. If a well is determined to be viable, then well completion may include forming a production casing for cased-hole operations.

Because a drill string can contain any of a variety of tubular components and other equipment custom-selected for a particular job or site, the term "segment" is used generally throughout this disclosure to refer to any part of the drill string. For example, a segment may refer to downhole oilfield tools including a downhole motor, components of a rotary steerable or directional drilling system, components of measurement while drilling ("MWD") equipment, components of logging while drilling ("LWD") equipment, and components of telemetry systems. A particular segments may have a small diameter and a relatively long length such as, for example, a depth to bore diameter ratio greater than 10:1. According to one example, segments or components thereof may include a substantially cylindrical external shape and may include complex internal features and shapes. The internal features may be oriented parallel to, perpendicular to, or at an angle to a center line passing axially through the segment. One of ordinary skill in the art will readily appreciate that internal and external features of segments may be provided in any shape.

This disclosure describes novel systems and methods of designing and manufacturing segments for drill string in order to reduce machining costs and manufacturing complexity. This disclosure describes producing segments from a plurality of slices or layers. According to one example, the layers may be sliced in a direction perpendicular to an axial direction of the segment. During the manufacturing process, the plurality of layers are arranged in a preselected order and may be exposed to a welding process that fuses the plurality of layers together to form a solid segment as described in greater detail below. The manufacturing process may be performed in a standard environment, such as a factory, warehouse, or the like. In other words, the manufacturing process does not require vacuum conditions, temperature control, or the like.

This disclosure provides a system and method of manufacturing segments using incremental construction techniques such as layer manufacturing that allows for incremental monitoring of design tolerances during production. Furthermore, this disclosure provides a system and method of re-manufacturing portions of partially assembled segments during production. According to one example, segments include long parts with complex internal features. For example, the internal features may include long and narrow bores that form a narrow wireway to direct and pass wires or the like. Alternatively or additionally, the internal features may include long and narrow bores that form a narrow hydraulic passage to direct and pass hydraulic fluids, borehole fluids, formation fluids, or the like. Alternatively or additionally, the internal features may include cavities that receive components such as control valves, connectors, gauges, sensors, or the like. One of ordinary skill in the art will readily appreciate that other internal features may be provided in the drill string.

FIG. 1A is a partial cross-sectional view of a drilling rig for drilling a wellbore with the drilling system 100. The drilling system 100 employs a drill string 112 with downhole tools described herein to form a subterranean well according to one example. The subterranean well is illustrated with a wellbore 102 drilled into the earth 104 from the ground's surface 106 using a drill bit 110 provided on the drill string 112. For illustrative purposes, the top portion of the wellbore 102 includes a surface casing 107 that defines and stabilizes the wellbore 102 after being drilled, which is cemented in place. The wellbore 102 also may include intermediate casings (not shown), which may be stabilized with cement. The casing 107 performs several functions, including preventing wellbore collapse, maintaining a physical separation between the Earth's layers, providing a barrier to prevent fluid migration, enhancing safety, and protecting the Earth's layers from any contaminants, or the like.

The drill bit 110 is located at the bottom, distal end of the drill string 112. During drilling operations, the drill string 112 with the included BHA with drill bit 110 are advanced into the earth 104 by a drilling rig 120, typically by rotating the drill string 112 from the surface. The drilling rig 120 may be supported directly on land as illustrated or on an intermediate platform if at sea.

The wellbore 102, which is illustrated extending downhole into the Earth's layers, and any components inside the wellbore 102 are subjected to hydrostatic pressure originating from subterranean destinations or formations.

The lower end portion of the drill string 112 may include a drill collar provided proximate to the drilling bit 110. The drill bit 110 may be a roller cone bit, a fixed cutter bit, or any other type of bit known in the art. For purposes of completeness, FIG. 1A illustrates that the disclosure supports coiled tubing 150 and wireline 152 deployment, which are contemplated and within the context of this disclosure.

Figure 1B:
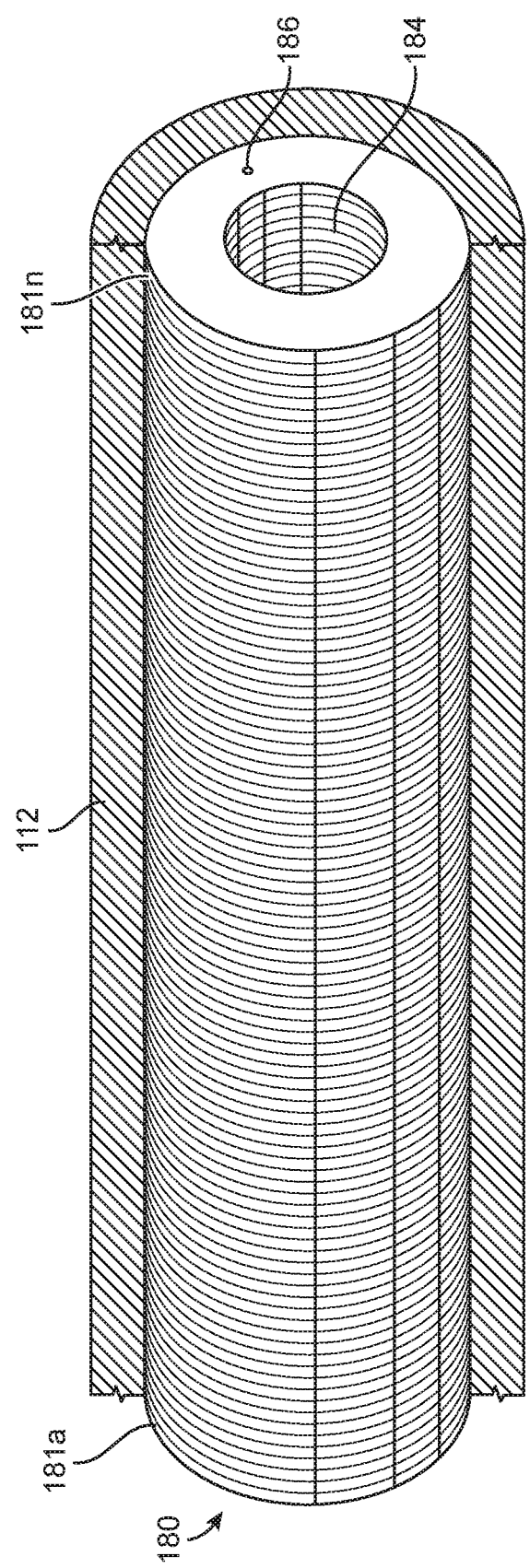
FIG. 1B is a perspective cross-sectional view illustrating a drill pipe encasing a segment constructed from a plurality of layers according to the present disclosure.

FIG. 1B is a perspective cross-sectional view of a section of drill string 112 that encases a segment 180 constructed from a plurality of fused layers 181a-181n as described in greater detail below. While the drill string 112 and the segment 180 are illustrated as being in direct contact, one of ordinary skill in the art will readily appreciate that intermediate components may be provided between the drill string 112 and the segment 180. For example, seals, bearings, wear sleeves, and other intermediate components may be provided between the drill string 112 and the segment 180.

Figure 2:
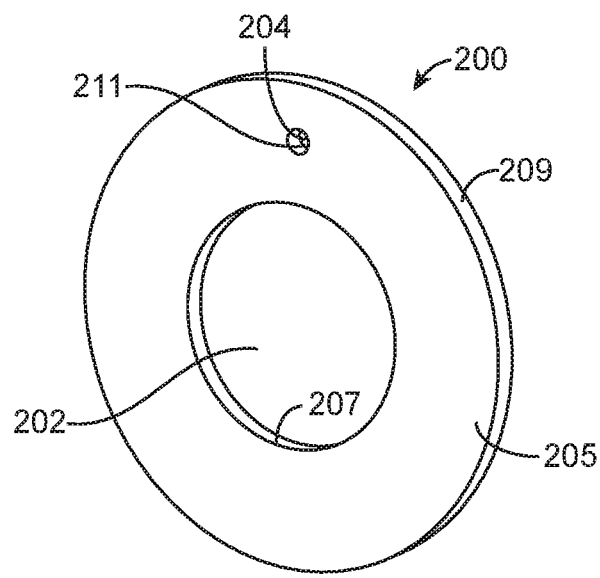
FIG. 2 is a perspective view of one embodiment of a single layer that corresponds to the segment illustrated in FIG. 5, according to the present disclosure.
Figure 5:
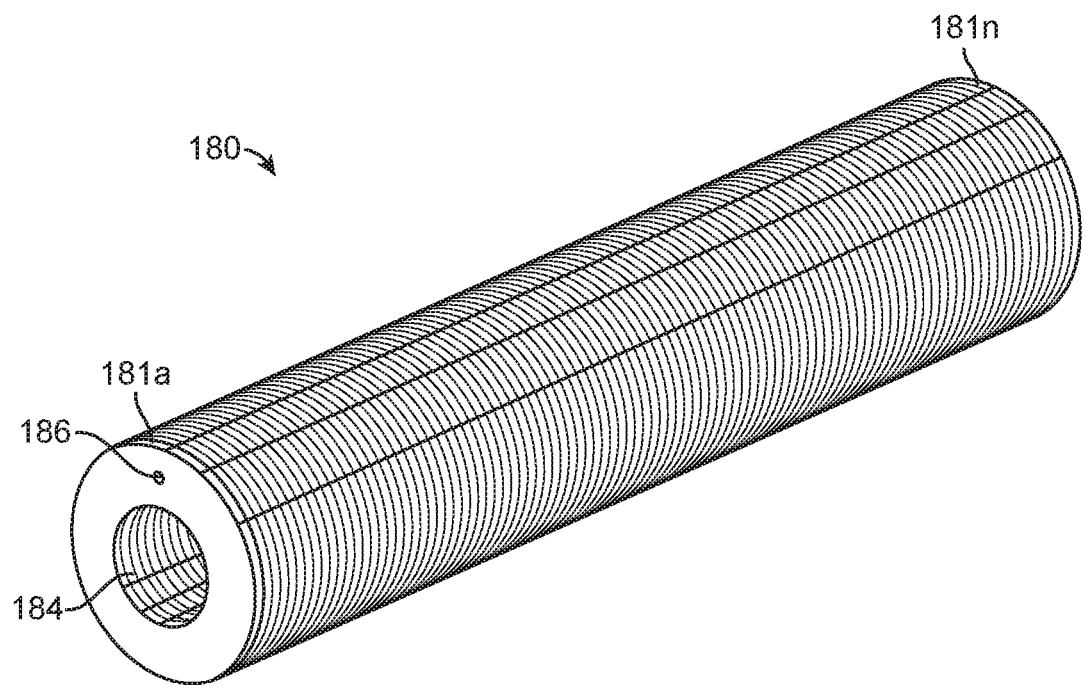
FIG. 5 is a perspective view of one embodiment of a segment constructed from a plurality of fused layers, the segment includes a long and narrow bore feature according to the present disclosure.

FIG. 2 is a perspective view of a single layer 200 that when fused with other single layers 200 produces a segment 180 having fused layers 181a-181n, such as illustrated by way of example in FIG. 5. According to one example, the single layer 200 may include a large aperture 202 and a small aperture 204. While the single layer 200 is illustrated to include apertures 202, 204, one of ordinary skill in the art will readily appreciate that the single layer 200 may include any number of apertures, any size of apertures, any shape of aperture, to meet desired design goals.

According to one example, the single layer 200 may be formed using known machining techniques such as turning, milling, forging, electric discharge machining ("EDM"), among other subtractive manufacturing techniques. For example, the single layer 200 may be formed using sheet-metal forming or stamping processes. Upon creating the single layer 200, additional subtractive manufacturing techniques may be used to define features within the single layer 200. One of ordinary skill in the art will readily appreciate that selection of the appropriate technique for forming and creating the single layer 200 may be based on factors such as a desired thickness of the single layer 200, desired dimensions of the single layer 200, desired dimensions of features within the single layer 200, and desired tolerances of dimensions, or the like.

With further reference to FIG. 2, the various surfaces 205, 207, 209, 211 of the single layer 200 are exposed to the atmosphere before being fused into the segment 180 having fused layers 181a-181n. Accordingly, these various surfaces 205, 207, 209, 211 may be easily accessed prior to being fused into the segment 180. For example, these various surfaces 205, 207, 209, 211 may be accessed using conventional spraying techniques and may be spray coated for protection from harmful contact with heat, corrosive fluids, or the like. Spray coating these surfaces may provide beneficial qualities such as increased wear resistance, increased corrosion resistance, or the like. Additionally, the single layer 200 may be quickly inspected prior to being fused in order to confirm that a desired treatment was performed. By contrast, conventional segments that are machined from material having a depth to bore diameter ratio greater than 10:1 are dimensioned to require specialized equipment to access interior features of the segment. Assuming specialized equipment is available to perform desired operations, any desired inspections will also require specialized equipment. Accordingly, the single layer construction described herein provides advantages over existing techniques that use material having a depth to bore diameter ratio greater than 10:1 to manufacture downhole tool components.

Another advantage of assembling a segment 180 from a plurality of single fused layers 181 as described herein is that components such as sensors, antennas, and electrical wiring may be embedded within any portion of a partially assembled segment 180 during fabrication. Accordingly, component placement constraints within the segment 180 are eased since components may be spread throughout the entire volume of the segment 180 during fabrication. Thus, component separation distances within the tool or segment 180 may be increased in order to reduce component interference. Furthermore, the manufacturing techniques described herein allow component stacking along the axial direction during fabrication. By contrast, existing manufacturing techniques limit component placement to peripheral areas of segments that are easily reached after fabrication using subtractive manufacturing techniques. Thus, existing manufacturing techniques provide higher density configurations by limiting component placement after fabrication to areas that are proximate to the surface of the segment.

Returning to FIG. 1A, sensor sub-units 130, 132 are shown within the cased portion of the well and may be embedded into corresponding segments 180 using the techniques described herein. Sensor sub-units 130, 132 may be components of MWD and LWD tools that are enabled to sense nearby characteristics and conditions of the drill string, formation fluid, casing, and surrounding formation, or the like. Data corresponding to the sensed conditions and characteristics may be recorded downhole for later download such as at a processor (not shown) that may be embedded into a corresponding segment 180 using the techniques described herein. Alternatively, the data may be communicated to the surface either by wire using repeaters 134,136 up to surface wire 138, or wirelessly using components embedded into corresponding segment 180 using the techniques described herein. If wirelessly, the downhole transceiver (antenna) 134 may be utilized to send data to a local processor 140, via surface transceiver (antenna) 142. These components may be embedded into corresponding segments 180 using the techniques described herein. The data may be either processed at the processor 140 or further transmitted along to a remote processor 144 via wire 146 or wirelessly via antennae 142 and 148. A surface installation 170 may be provided to send and receive data to and from the well via repeaters 134,136. The data may include well conditions such as formation hydrostatic pressure, backpressure hydrostatic pressure, well depth, temperatures, or the like.

With respect to serviceability of components that are embedded throughout the entire volume of the segment 180, these lower density segments 180 may be manufactured for replacement rather than repair. In other words, any segments 180 having axially stacked components to provide lower component density may be manufactured for replacement rather than repair. For example, these segments 180 may be of a smaller size and may be positioned for easy access and removal from the drill string. Furthermore, if these segments 180 with axially stacked components are produced at lower cost with improved reliability, then these segments 180 may be replaced on a pre-determined schedule prior to failure. Still further, these segments 180 may be sent to a recycling facility and selected portions may be incorporated into new segments during the assembly process described herein.

According to another example, the components may be embedded into the segment 180 when a cavity designed to hold a corresponding component is substantially complete to support the component. Accordingly, the component may be inspected and tested during construction to improve quality control, for example. By contrast, existing techniques do not support embedding components into a segment during assembly. For example, existing techniques that employ additive manufacturing to construct segments using a plurality of single layers do not enable inspection and testing of components during construction. Typically, existing systems require subtractive manufacturing techniques such as drilling to access pre-formed cavities designed to hold components. As discussed above, existing manufacturing techniques limit component placement to areas that are reachable after fabrication using subtractive manufacturing techniques. Furthermore, compared to the disclosure herein, existing systems require additional steps for placing components in pre-formed cavities.

Figure 3:
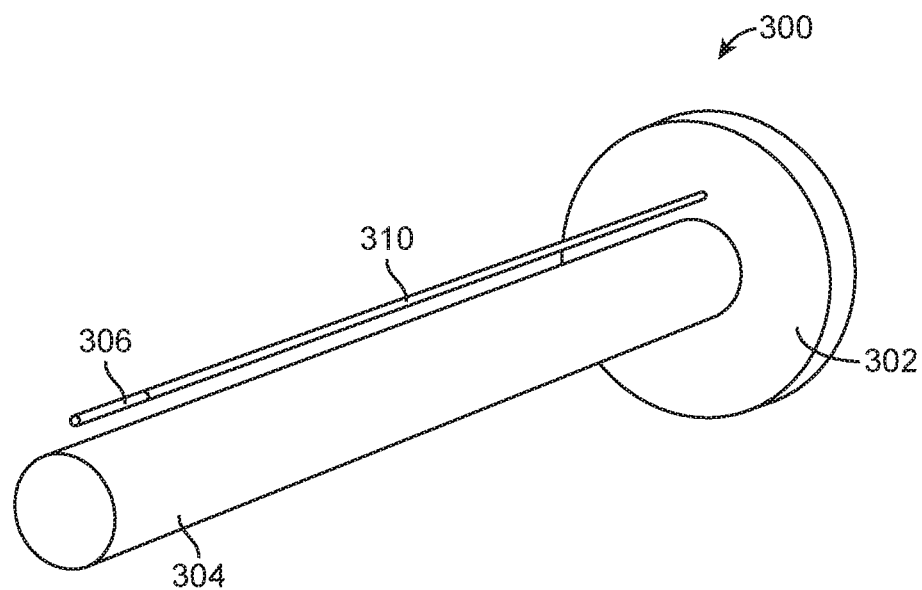
FIG. 3 is a perspective view of one embodiment corresponding to a fixture used to form a segment, according to the present disclosure.

FIG. 3 is a perspective view of a fixture 300 that may be used to assemble the segment from a plurality of single unfused layers 200 illustrated in FIG. 2. The fixture 300 includes a base 302 that supports alignment features such as a large rod 304 and a small rod 306. The large rod 304 may be dimensioned to correspond to aperture 202. The small rod 306 may be dimensioned to correspond to aperture 204. Additionally, the large rod 304 and the small rod 306 may be oriented on the base 302 to align with a relative positioning of apertures 202, 204 on the single layer 200.

According to one example, a tube or insert may be provided to fit over the large rod 304 and/or the small rod 306. For example, if the apertures 204 from a plurality of single unfused layers 200 are provided to form a fluid passage such as hydraulic passageway, then a solid tube 310 may be inserted over the small rod 306 to provide a continuous lining on the inside of the apertures 204. In this case, the apertures 204 may be machined with a circumference that fits over the outer diameter of the tube 310. The tube 310 may be secured within the passageway using a press fit. Alternatively, the tube 310 may be secured within the passageway by welding. In operation, the tube 310 may prevent fluid from leaking out of the fluid passage if any of the single fused layers 181 do not form a fluid tight passage. For example, the single fused layers 181 may not form a fluid tight passage if a welding operation is not performed in close proximity to a narrow bore formed by the apertures 204. According to one example, the welding operation may not be performed proximate to the apertures 204 in order to avoid deformation of the apertures 204.

Figure 4:
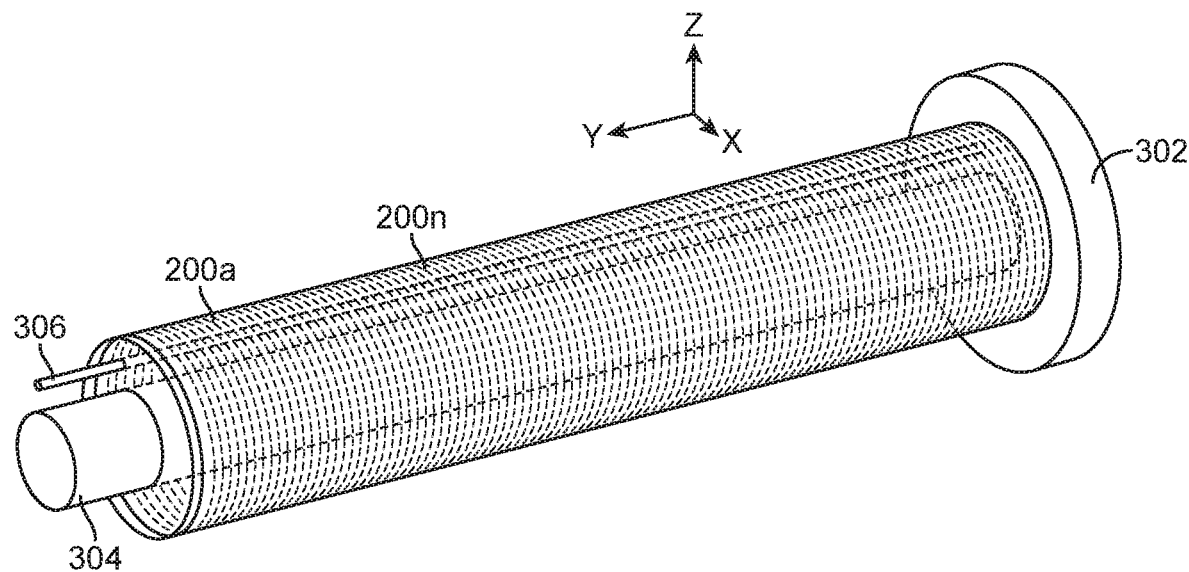
FIG. 4 is a perspective view of one embodiment corresponding to a fixture having a segment mounted thereon, the segment being constructed from a plurality of layers, according to the present disclosure.

FIG. 4 is a perspective view of the fixture 300 with the plurality of unfused single layers 200a-200n (hereinafter 200) mounted thereon. As shown, the large rod 304 is received by the apertures 202 of the plurality of unfused single layers 200 and the small rod 306 is received by the apertures 204 of the plurality of unfused single layers 200. According to one example, the fixture 300 is designed to allow movement of the plurality of unfused single layers 200 in only two degrees of freedom. In this case, the fixture 300 is designed to allow movement of the plurality of unfused single layers 200 in a lengthwise or axial direction (y-direction). Stated differently, the fixture 300 is designed to restrict movement of the plurality of unfused single layers 200 in the x- and z-directions.

If any of the unfused single layers 200 are identified as being defective during assembly, then the damaged single layer 200 may be discarded and replaced with another single layer 200 during assembly. In other words, the unfused single layer 200 or a plurality of unfused single layers 200 may be discarded if damaged. However, an entire unfused segment is not discarded when one or more of the unfused single layers 200 are identified as damaged. Accordingly, the manufacturing process described herein generates little waste compared to conventional downhole tool manufacturing techniques.

According to one example, the fixture 300 may be segmented so that different portions of segment 180 may be manufactured concurrently. For example, if one portion of the segment 180 is inspected by an electrical technician and another portion of the same segment 180 is inspected by a mechanical technician, then the portion inspected by the electrical technician may be constructed separate from the portion inspected by the mechanical technician. After each portion is approved, the separate portions may be joined or fused together to form the completed segment 180. In this way, the manufacturing process may be expedited by operating in a parallel fashion rather than a serial fashion. For example, in a serial operation one of the electrical technician or the mechanical technician would first inspect the device and then the other of the electrical technician or the mechanical technician would inspect the same device. The manufacturing process may be expedited by allowing different portions of the segment to be manufactured concurrently.

Alternatively, if one of the components to be embedded within the segment 180 it out of inventory, then the cavity may be left open and the remainder of the segment 180 may be completed. Once the component is returned to inventory, then the component may be inserted into the component cavity and the segment 180 may be fused together. Thus, the manufacturing process may be expedited by allowing certain portions of the segment 180 to be fused, while other portions of the segment 180 are left unfused until the appropriate components are available.

According to one example, the fixture 300 includes alignment features that maintain design tolerances for the segments 180. For example, the alignment features may maintain design tolerances such as angle tolerances, profile tolerances, and positional tolerances, or the like. The design tolerances are maintained to precisely form conduits or passages through the segments 180. With reference to FIG. 4, the alignment features may include the large rod 304 and the small rod 306. These alignment features maintain the angle tolerances, the profile tolerances, and the positional tolerances, among other tolerances, in order to precisely form conduits or passages through the segments 180. One of ordinary skill in the art will readily appreciate that other alignment features may be provided at the fixture 300 to maintain desired design tolerances for the segments 180.

FIG. 5 is a perspective view of a fused segment 180 having a depth to bore diameter ratio greater than 10:1 produced from the manufacturing process described herein. According to one example, the fused segment 180 may include a depth to bore diameter ratio of 100:1. After the unfused single layers 200 are aligned using the fixture 300 as depicted in FIG. 4, a suitable metal joining process is employed to join the unfused single layers 200 together. For example, electron beam welding may be employed to join the unfused single layers 200 together. According to one example, electron beam welding may be used to weld workpieces that are over 4 inches (100 mm) thick. In one example, electron beam welding may penetrate up to a depth of 2.36 inches (60 mm) during one pass. Electron beam welding offers various benefits such as producing minimal deformations after welding, allowing precise computer numerical control, and producing good results on workpieces having a high depth-width ratio. One of ordinary skill in the art will readily appreciate that other metal joining processes may be used including laser sintering, adhesive bonding, or the like. One of ordinary skill in the art will readily appreciate that the selection of a metal joining process will depend on several factors including a desired strength of the final product, cost, and intended use of the completed fused segment. According to one example, the fused segment 180 may be formed from any material suitable for and compatible with rotary drilling such as high strength stainless steel.

According to one example, the segment 180 may be constructed from a plurality of fused layers 181a-181n that are fused together using a metal joining process. Prior to performing the metal joining process, the plurality of fused layers 181a-181n may be arranged in a preselected order and aligned using the alignment features of fixture 300 as depicted in FIG. 4. After the metal joining process is performed, the unfused single layers 200a-200n become fused together to form a solid segment 180. Additionally, the apertures defined within the plurality of fused layers 181a-181n are fused together to form bores 184, 186 that extend axially through the segment 180. As discussed above, a tube 310 may be inserted into any fluid passages during the assembly process to prevent fluid from leaking out of the fluid passage.

According to another example, the fused segment 180 may be subjected to additional machining or secondary processes. For example, the fused segment 180 may undergo case hardening or application of coatings. The additional machining may be provided to form multiple intricate cross-sectional profiles, such as inserts with multiple hydraulic and electrical pathways. One of ordinary skill in the art will readily appreciate that selected features may be constructed prior to performing the metal joining process, while other features may be constructed after the metal joining process is performed. For example, a long and narrow passage running axially through the fused segment 180 may be constructed prior to performing the metal joining process. By contrast, a bore for an oil filled port may be machined after the metal joining process is performed.

With reference again to FIG. 1A, a drilling fluid (mud) 160 may be circulated through the drilling components in a relatively unrestricted and unimpeded manner to perform functions such as preventing blow-out and preventing collapse of the wellbore 102. According to one example, the drilling fluid 160 may be circulated during drilling operations through the drill string 112, the drill bit 110, and the annulus 109. According to one example, the bore 184 may extend through the drill string 112 to the drill bit 110 that includes nozzles that direct a flow of the drilling fluid 160. After passing through the drilling components, the drilling fluid 160 may be circulated to the surface 106, where it passes through a filter (not shown) to remove any drilling debris, such as cuttings or the like. According to one example, the filter may include a shale shaker or the like. The filtered drilling fluid 160 may be collected in a tank 162 for re-circulation through the drilling components. The drilling fluid 160 may be formulated to perform other functions, including lubricating the drill bit 110, cooling the drill bit 110, flushing drilling debris such as rock away from the drill bit 110 and upward to the Earth's surface 106 through the annulus 109 formed between the wellbore 102 and the drill string 112, and reducing friction between the drill string 112 and the wellbore 102, or the like.

FIG. 1A illustrates an exemplary rotary steerable drilling device 111, which also may be referred to as a drilling direction control device or system. The rotary drilling device 111 is positioned on the drill string 112 with drill bit 110. However, one of skill in the art will recognize that the positioning of the rotary steerable drilling device 111 on the drill string 112 and relative to other components on the drill string 112 may be modified while remaining within the scope of the present disclosure. The rotary steerable drilling device 111 may include a rotatable drilling shaft that is coupled or attached to a rotary drill bit 110 and to rotary drill string 112 during the drilling operation.

Figure 6:
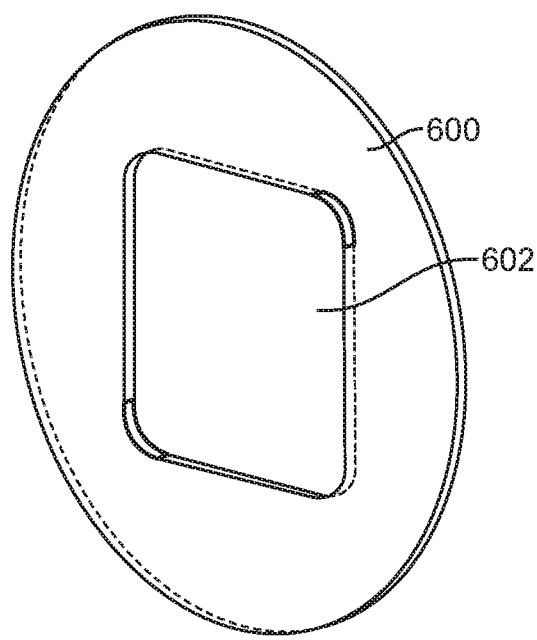
FIG. 6 is a perspective view of another embodiment of a single layer that corresponds to the segment illustrated in FIG. 9, according to the present disclosure.
Figure 9:
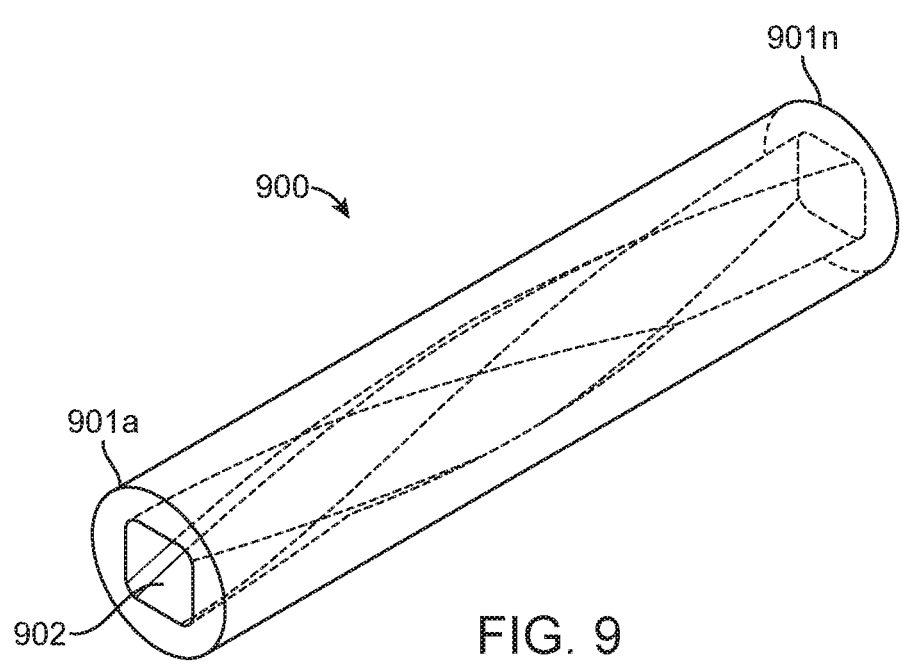
FIG. 9 is a perspective view of one embodiment of a segment constructed from a plurality of fused layers, the segment includes a long and narrow bore feature according to the present disclosure.

FIG. 6 is a perspective view of a second example of a single layer 600 that when fused with other single layers 600 produces a segment 900 as illustrated in FIG. 9. According to one example, the single layer 600 may include a square aperture 602 with rounded corners. While the single layer 600 is illustrated to include square aperture 602, one of ordinary skill in the art will readily appreciate that the single layer 600 may include any number of apertures, any size of apertures, any shape of aperture, to meet desired design goals.

According to one example, the single layer 600 may be formed using known machining techniques such as turning, milling, forging, electric discharge machining ("EDM"), among other subtractive manufacturing techniques. For example, the single layer 600 may be formed using sheet-metal forming or stamping processes. Upon creating the single layer 600, additional subtractive manufacturing techniques may be used to define features within the single layer 600. One of ordinary skill in the art will readily appreciate that selection of the appropriate technique for forming and creating the single layer 600 may be based on factors such as a desired thickness of the single layer 600, desired dimensions of the single layer 600, desired dimensions of features within the single layer 600, and desired tolerances of dimensions, or the like.

Figure 7:
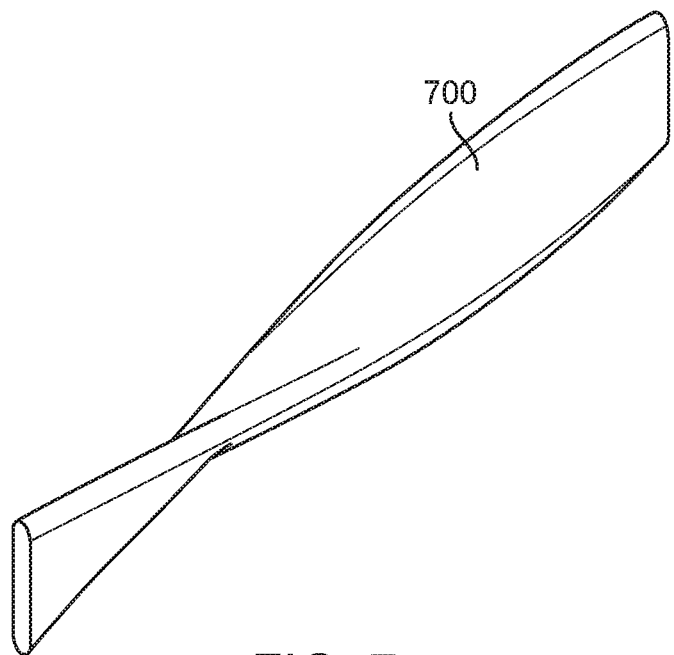
FIG. 7 is a perspective view of another embodiment corresponding to a fixture used to form a segment, according to the present disclosure.

FIG. 7 is a perspective view of a fixture 700 that may be used to assemble the segment 900 from a plurality of unfused single layers 600 illustrated in FIG. 6. The fixture 700 defines a spiral-shaped alignment feature. The fixture 700 may be dimensioned to correspond to square aperture 602.

Figure 8:
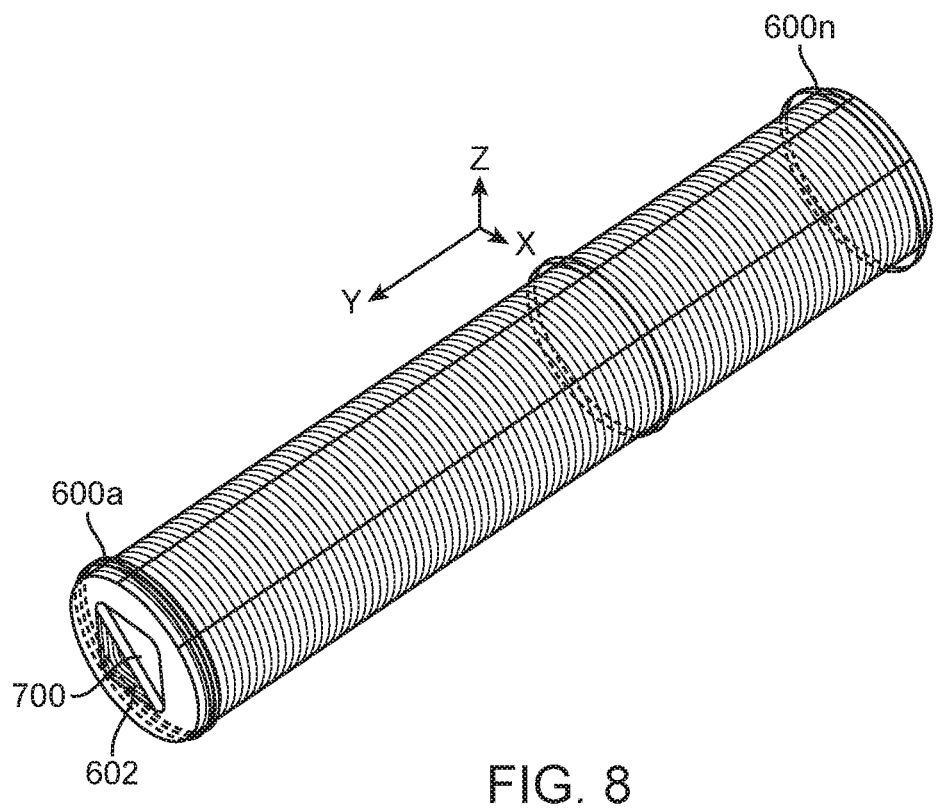
FIG. 8 is a perspective view of another embodiment corresponding to a fixture having a segment mounted thereon, the segment being constructed from a plurality of layers, according to the present disclosure.

FIG. 8 is a perspective view of the fixture 700 with the plurality of unfused single layers 600a-600n mounted thereon. As shown, the fixture 700 is received by the square apertures 602 of the plurality of unfused single layers 600a-600n. According to one example, the fixture 700 is designed to allow movement of the plurality of unfused single layers 600a-600n in only two degrees of freedom. In this case, the fixture 700 is designed to allow movement of the plurality of unfused single layers 600a-600n in a lengthwise or axial direction (y-direction). Stated differently, the fixture 700 is designed to restrict movement of the plurality of unfused single layers 600a-600n in the x- and z-directions.

If any of the unfused single layers 600a-600n are identified as being defective during assembly, then the damaged unfused single layer 600 may be discarded and replaced by another unfused single layer 600 during assembly. In other words, an unfused single layer 600 or a plurality of unfused single layers 600 may be discarded if damaged. However, an entire segment 900 is not discarded when one or more of the unfused single layers 600a-600n is identified as damaged. Accordingly, the manufacturing process described herein generates little waste compared to conventional manufacturing techniques.

According to one example, the fixture 700 defines a spiral-shaped alignment feature that maintains design tolerances for the segments. For example, the spiral-shaped alignment feature may maintain design tolerances such as the angle tolerances, the profile tolerances, and the positional tolerances in order to precisely form a conduit or passage through the segments. One of ordinary skill in the art will readily appreciate that the fixture 700 may define other alignment features to maintain desired design tolerances for the segments.

FIG. 9 is a perspective view of the fused segment 900 having a depth to bore diameter ratio greater than 10:1 produced from the manufacturing process described herein. After the unfused single layers 600a-600n are aligned using the fixture 700 as depicted in FIG. 8, a suitable metal joining process is employed to join the single layers 600a-600n together. As described above, electron beam welding may be employed to join together the unfused single layers 600a-600n. One of ordinary skill in the art will readily appreciate that other metal joining processes may be used including laser sintering, adhesive bonding, or the like. One of ordinary skill in the art will readily appreciate that the selection of a metal joining process will depend on several factors including a desired strength of the final product, cost, and intended use of the completed fused segment 900. According to one example, the segment 900 may be formed from any material suitable for and compatible with rotary drilling such as high strength stainless steel.

According to one example, the segment 900 may be constructed from a plurality of fused layers 901a-901n that are fused together using a metal joining process. Prior to performing the metal joining process, the plurality of unfused layers 600a-600n may be arranged in a preselected order and aligned using the alignment feature of fixture 700 as depicted in FIG. 8. After the metal joining process is performed, the individual unfused layers 600a-600n become fused together to form a solid segment 900. Additionally, the square aperture defined within the plurality of fused layers 901a-901n are fused together to form a bore 902 that extends axially through the segment 900. As discussed above, a tube 310 may be inserted into any fluid passages during the assembly process to prevent fluid from leaking out of the fluid passage.

According to another example, the constructed fused segment 900 may be subjected to additional machining or secondary processes. For example, the constructed fused segment 900 may undergo case hardening or application of coatings. The additional machining may be provided to form multiple intricate cross-sectional profiles, such as inserts with multiple hydraulic and electrical pathways. One of ordinary skill in the art will readily appreciate that selected features may be constructed prior to performing the metal joining process, while other features may be constructed after the metal joining process is performed. For example, a long and narrow passage running axially through the fused segment 900 may be constructed prior to performing the metal joining process. By contrast, a bore for an oil filled port may be machined after the metal joining process is performed.

Methods of designing and manufacturing segments include employing a computer file such as computer aided design ("CAD") software to define a three-dimensional structure of the segment. The CAD software is programmed to slice a segment or downhole tool into a plurality of layers. According to one example, each of the plurality of layers may be of equal thickness. Alternatively, each of the plurality of layers may have different thicknesses. For example, the layer thickness may be less than 1 mm; less than 10 mm; less than 100 mm; among other layer thicknesses.

According to one example, a computer algorithm may be employed to select a layer thickness. The layer thickness may be selected based on a complexity of internal features associated with the corresponding layer. For example, the layer thickness may be selected based on criteria such as a number of apertures provided in a layer, an area defined by the aperture openings provided in the layer, a smallest aperture size in a layer being smaller than a preselected size, a largest aperture size in a layer being larger than a preselected size, or the like. Additionally, the layer thickness may be selected based on a type of material used to form the segment, a type of joining process selected, or the like. One of ordinary skill in the art will readily appreciate that other criteria may be used to determine a layer thickness.

According to one example, the CAD software may employ a slicing function to determine a geometry of the plurality of layers. After the geometry is determined, the plurality of layers may be manufactured using the various techniques described herein. The number of layers to be manufactured will depend on a thickness of each layer and an overall length of the segment. After the plurality of layers is manufactured, an alignment feature is inserted into a corresponding aperture of the plurality of layers in order to stack the plurality of layers on the fixture. As described herein, the fixture is designed to allow movement of the plurality of layers in only two degrees of freedom, such as a lengthwise or axial direction (y-direction). After the plurality of layers is appropriately positioned on the alignment feature and any internal components are embedded, then a joining process may be performed to fuse together the plurality of layers.

Figure 10:
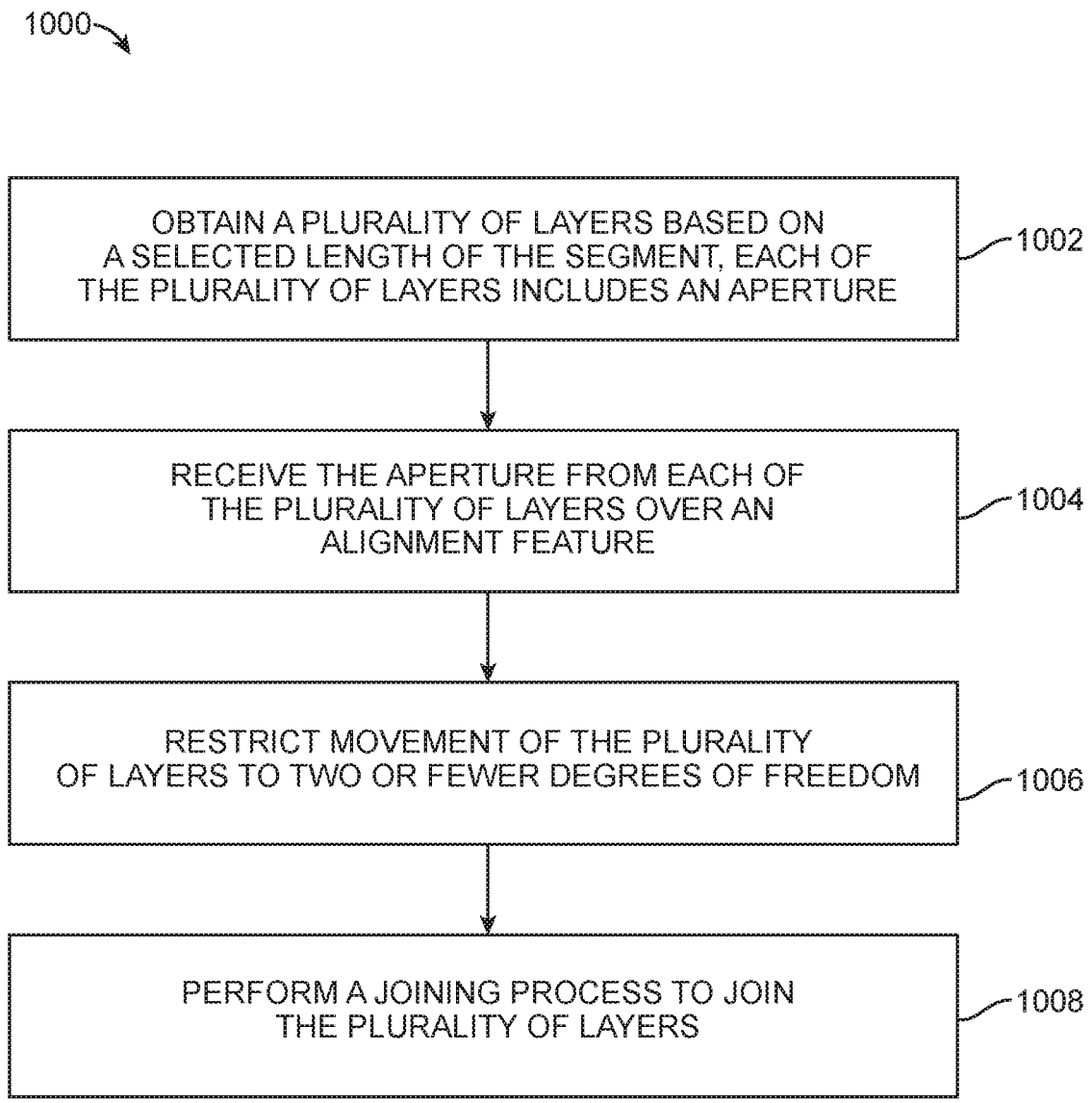
FIG. 10 is a flowchart of an example method according to the present disclosure.

FIG. 10 is a flowchart of an example method 1000 according to the present disclosure. The method 1000 may be implemented using one or more of the above described components. For example, the method 1000 may be implemented using a fixture. The fixture may include an alignment feature that restricts movement of the plurality of layers to two or fewer degrees of freedom.

The method 1000 may include obtaining a plurality of layers based on a selected length of the segment, wherein each of the plurality of layers includes an aperture formed therein (block 1002). For example, five hundred (500) individual layers may be obtained to form a desired segment. The method 1000 may further include receiving the aperture from each of the plurality of layers over an alignment feature (block 1004). For example, each of the 500 individual layers may include an aperture that is inserted over an alignment feature to properly align the 500 individual layers relative to each other. The alignment feature may be configured as described above. The method 1000 also may include restricting movement of the plurality of layers to two or fewer degrees of freedom (block 1006). For example, the fixture having the alignment feature is designed to allow movement of the 500 individual layers in a lengthwise or axial direction (y-direction). Additionally, the method may include performing a joining process to join the plurality of layers (block 1008). In this way, the 500 individual layers are fused together to form a solidly fused segment.

Numerous examples are provided herein to enhance understanding of the present disclosure. A specific set of examples are provided as follows. In a first example, a method is disclosed for assembling a segment of a drill string constructed from a plurality of layers, the method includes obtaining a plurality of layers based on a selected length of the segment, each of the plurality of layers including an aperture formed therein; receiving the aperture from each of the plurality of layers over an alignment feature; restricting movement of the plurality of layers to two or fewer degrees of freedom; and joining the plurality of layers.

In a second example, there is disclosed herein the method according to the preceding first example, wherein receiving the aperture formed in each of the plurality of layers over the alignment feature includes receiving the plurality of layers in a preselected order.

In a third example, there is disclosed herein the method according to any of the preceding examples first to second, further comprising removing at least one layer from the alignment feature upon identifying a defect in the at least one layer.

In an fourth example, there is disclosed herein the method according to any of the preceding examples first to third, further comprising replacing the removed at least one layer with at least one replacement layer, each of the at least one replacement layers including an aperture that is received over the alignment feature.

In a fifth example, there is disclosed herein the method according to any of the preceding examples first to fourth, wherein joining the plurality of layers is performed after the at least one replacement layer is received over the alignment feature.

In a sixth example, there is disclosed herein the method according to any of the preceding examples first to fifth, wherein selected ones of the plurality of layers include a cavity aperture provided to form a cavity within the downhole tool.

In a seventh example there is disclosed herein the method according to any of the preceding examples first to sixth, wherein the cavity aperture receives a component therein during assembly of the segment.

In an eighth example, there is disclosed herein the method according to any of the preceding examples first to seventh, wherein the plurality of layers are jointed using at least one of electron beam welding, laser sintering, and adhesive bonding.

In a ninth example, a method is disclosed for assembling a segment of a drill string constructed from a plurality of layers, the method includes obtaining a plurality of layers based on a selected length of the segment, each of the plurality of layers including an aperture formed therein; receiving the aperture from each of the plurality of layers over an alignment feature; restricting movement of the plurality of layers to two or fewer degrees of freedom; removing at least one layer from the alignment feature upon identifying a defect in the at least one layer; replacing the removed at least one layer with at least one replacement layer, each of the at least one replacement layers including an aperture that is received over the alignment feature; and joining the plurality of layers and the at least one replacement layer.

In a tenth example, there is disclosed herein the method according to the ninth example, wherein receiving the aperture formed in each of the plurality of layers over the alignment feature includes receiving the plurality of layers in a preselected order.

In an eleventh example, there is disclosed herein the method according to the examples ninth and tenth, wherein selected ones of the plurality of layers includes a cavity aperture provided to form a cavity within the segment.

In a twelfth example, there is disclosed herein the method according to the examples ninth and eleventh, wherein the cavity aperture receives a component therein during assembly of the segment.

In a thirteenth example, there is disclosed herein the method according to the examples ninth and twelfth, wherein the component includes at least one of a sensor, an antenna, and electrical wiring.

In a fourteenth example, a system is provided for forming a segment of a drill string, the system includes a plurality of layers, each of the plurality of layers including an aperture formed therein; an alignment feature that receives the plurality of layers, the alignment feature restricting movement of the plurality of layers to two or fewer degrees of freedom; and a fastener that joins the plurality of layers to form a fused segment.

In a fifteenth example, there is disclosed herein the joint according to the preceding fourteenth example, wherein the alignment feature receives the plurality of layers in a preselected order.

In a sixteenth example, there is disclosed herein the joint according to the preceding fourteenth and fifteenth examples, wherein the alignment feature allows removal of at least one layer upon identifying a defect in the at least one layer.

In a seventeenth example, there is disclosed herein the joint according to the preceding fourteenth and sixteenth examples, wherein the alignment feature allows replacement of the at least one layer with at least one replacement layer, each of the at least one replacement layers including an aperture that is received over the alignment feature.

In an eighteenth example, there is disclosed herein the joint according to the preceding fourteenth and seventeenth examples, wherein the fastener includes at least one of an electron beam welder, a laser sinter, and an adhesive bonder.

In a nineteenth example, there is disclosed herein the joint according to the preceding fourteenth and eighteenth examples, wherein selected ones of the plurality of layers include a cavity aperture provided to form a cavity within the segment.

In a twentieth example, there is disclosed herein the joint according to the preceding fourteenth and nineteenth examples, wherein the cavity aperture receives a component therein.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:
1. A system for assembling a segment of a drill string, the system comprising:

a plurality of unfused physical layers including an aperture formed therein, the plurality of unfused physical layers manufactured based on a plurality of planned layers, the plurality of planned layers determined by slicing a virtual three-dimensional tubular structure into the plurality of planned layers;

an alignment feature having the plurality of unfused physical layers inserted over the alignment feature to align the aperture formed therein from the plurality of unfused physical layers, and wherein the plurality of unfused physical layers are fused to form the segment, the aperture of each of the plurality of unfused physical layers together forming a common bore.

2. The system of claim 1, wherein the plurality of unfused physical layers are fused via electron beam welding.

3. The system of claim 1, wherein the plurality of unfused physical layers are arranged in a preselected order over the alignment feature.

4. The system of claim 1, wherein the alignment feature is spiral shaped.

5. The system of claim 1, wherein the alignment feature maintains design tolerances for the segment.

6. The system of claim 1, wherein the alignment feature comprises parallel rods and each of the plurality of unfused physical layers includes two or more apertures formed therein to receive the parallel rods.

7. The system of claim 6, wherein the parallel rods comprise a large rod and a small rod, the large rod having a larger diameter than the small rod.

8. The system of claim 7, further comprising fitting an insert over at least one of the large rod or the small rod before arranging the plurality of unfused physical layers over the alignment feature.

* * * * *